Aug. 5, 1924.                                               1,503,946
                        H. M. GUSDORF
        COMBINED PIGSKIN AND OTHER MATERIAL TRANSMISSION BELT
                      Filed Aug. 28, 1922
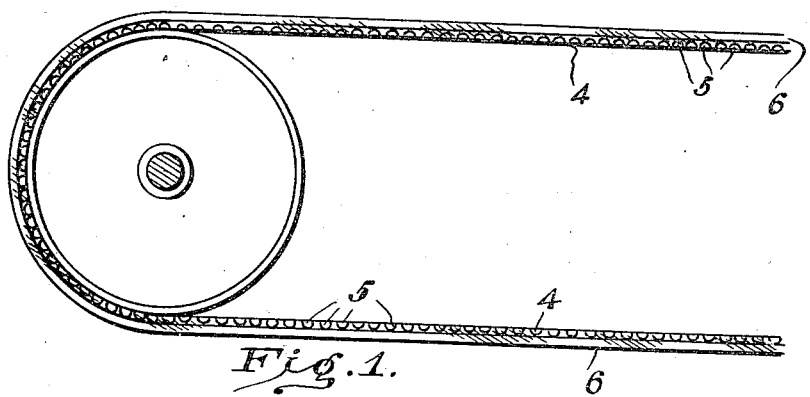
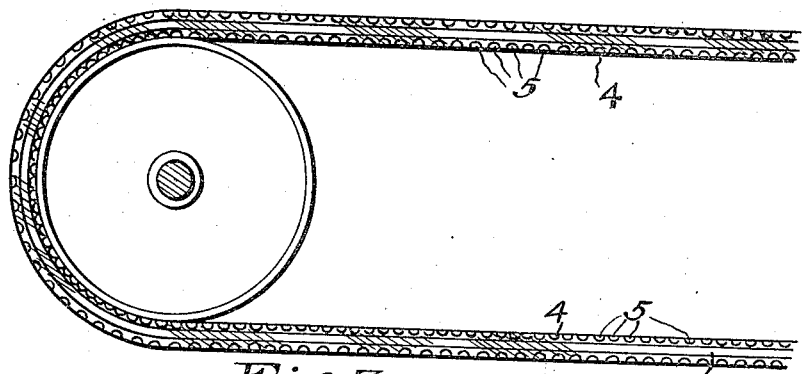
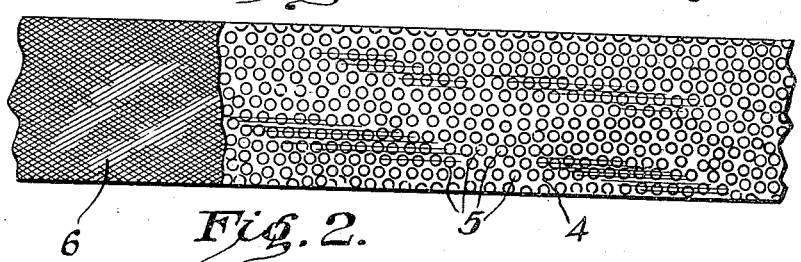
Inventor.
Harold M. Gusdorf
By Joseph A. Minturn
Attorney Patented Aug. 5, 1924.

1,503,946

UNITED STATES PATENT OFFICE.

HAROLD M. GUSDORF, OF INDIANAPOLIS, INDIANA.

COMBINED PIGSKIN AND OTHER MATERIAL TRANSMISSION BELT.

Application filed August 28, 1922. Serial No. 584,647.

*To all whom it may concern:*

Be it known that I, HAROLD M. GUSDORF, a citizen of the United States, residing at Indianapolis, in the county of Marion and State of Indiana, have invented new and useful Improvements in Combined Pigskin and Other Material Transmission Belts, of which the following is a specification.

There are different types of belt drives requiring correspondingly different physical properties in the belting used. In some cases the weight of the belt is an important factor, while in others the elasticity of the belt is paramount, and the object of this invention is to provide a combination of materials in which the superior pulling qualities of pigskin leather will be used with other materials, to meet all of the different requirements and to reenforce and join together the normally narrower and shorter lengths of pigskin leather, to provide belts wider than the average width of back strip taken from the pig-skins.

I accomplish the objects of the invention by means which are more or less diagrammatically illustrated in the accompanying drawings, in which—

Fig. 1, is a view in side elevation of a pulley with a belt drive made in accordance with my invention. Fig. 2 is a plan view of a portion of said belt looking at the pulley-contacting side thereof and showing the member broken away to illustrate the associated material, and Fig. 3, is a view similar to Fig. 1 of a modified belt wherein both sides are of pigskin with other materials between them.

Like characters of reference indicate like views in the several views of the drawings.

Pig (or hog) skin leather 4 is firmer on the outer or hair side than it is on the inner or flesh side, due to the existence on the flesh side of innumerable natural indents, pits or so-called cups 5. The result is a material having superior qualities for belt transmission because the cups provide spaces for the compressed particles compressed by the wrapping of the belt around the pulley and the cups also increase the suction of the belt on the pulley surface. Increase in weight of the belt as a whole or a reduction in its elasticity is obtained by adhesively or otherwise, uniting an outer layer 6, of cow-hide or other leather, fabric or other suitable material to the pigskin leather.

In come cases where both sides of a belt come in contact with different pulleys, two layers of pigskin with an intermediate layer of other material is desirable, as shown in Fig. 2.

Having thus fully described my invention, what I claim as new and wish to secure by Letters Patent, is—

1. In a laminated belt, the combination with a layer of pigskin leather of some other material than that uniting the two layers, substantially in the manner specified.

2. A laminated belt made of pigskin leather, in combination with a layer of some other fibrous material, the pulley contacting side of the belt being the pigskin leather.

3. A laminated belt made of pigskin leather, in combination with some other fibrous material, the pulley contacting side of the belt being the pigskin leather with the flesh side contacting the pulley.

4. A laminated belt having outer and inner surfaces made of pigskin leather with other fibrous layer material between them.

Signed at Indianapolis, Indiana, this 23rd day of August, 1922.

HAROLD M. GUSDORF.